United States Patent [19]

Ferrari et al.

[11] Patent Number: 5,535,504
[45] Date of Patent: Jul. 16, 1996

[54] MACHINE FOR APPLYING RUNNERS TO A DRAWER

[75] Inventors: Franco Ferrari, Frazione Deviscio, 2, 22053 Lecco; Carlo Migli, Lecco, both of Italy

[73] Assignee: Franco Ferrari, Italy

[21] Appl. No.: 408,947

[22] Filed: Mar. 23, 1995

[30] Foreign Application Priority Data

Mar. 29, 1994 [IT] Italy .................. MI94A0597

[51] Int. Cl.⁶ .................................. B23P 19/00
[52] U.S. Cl. ...................... 29/715; 29/796; 29/243.58
[58] Field of Search ................. 29/714, 715, 796, 29/243.57, 243.58, 281.1, 898.07, 898.09, 33.5; 72/176, 177, 210, 313, 314

[56] References Cited

U.S. PATENT DOCUMENTS

| 542,071 | 7/1895 | Westlake | 29/243.57 |
|---|---|---|---|
| 1,785,537 | 12/1930 | Stevens | 72/314 |
| 2,902,691 | 9/1959 | Kwasmiewski | 29/243.57 |
| 3,513,685 | 5/1970 | Flechas | 29/243.57 |

FOREIGN PATENT DOCUMENTS

| 355759 | 3/1980 | Austria . |
|---|---|---|
| 377721 | 4/1985 | Austria . |
| 387701 | 3/1989 | Austria . |
| 3805669 | 9/1988 | Germany . |
| 9113477 | 10/1991 | Germany . |
| 203826 | of 1985 | Italy . |

*Primary Examiner*—Peter Vo
*Assistant Examiner*—Khan Nguyen
*Attorney, Agent, or Firm*—Shlesinger, Fitzsimmons & Shlesinger

[57] ABSTRACT

A machine for fitting metal runners on a drawer comprises an actuator (44) for mechanically operating at least one hammer (24) for clinching gripping tabs against a side panel (16) of the drawer. The gripping tabs are laterally disposed along a longitudinally extending U-shaped groove formed in the runner (12) and extending from a longitudinal edge of the runner towards the hammer, prior to clinching. The hammer (24) and the corresponding anvil counter plate (22) extend in a longitudinal direction to the runner to simultaneously clinch all the gripping tabs. Advantageously, the machine comprises two clinching assemblies (20) to clinch both runners to a drawer in a single operation.

12 Claims, 3 Drawing Sheets

MACHINE FOR APPLYING RUNNERS TO A DRAWER

BACKGROUND OF THE INVENTION

This invention refers to a machine for rapidly fitting metal runners on a drawer.

In the furniture drawer manufacturing technology, to enable the drawers to slide/use is made of metal runners generally shaped in the form of a Z which constitute rails which slidingly receive wheels pivoted on complementary runners fitted in the compartment which houses the drawer in the furniture unit. The runners are applied close to the lower edge of each side panel of the drawer, with the lower wing of the Z constituting a resting surface for the lower end of the side panel, while the upper wing of the Z forms the aforesaid rail. Each drawer is consequently fitted with a special pair of runners.

Said runners are normally made according to two types: the first type consists of runners which can be fastened by means of screws inserted in the lower end of the side panel of the drawer, through holes made in the lower wing of the Z; the second type of runner is provided with fitting means which enable it to be secured without screws.

A runner has been proposed as described in the Italian patent 1,248,585 which corresponds to an abandoned U.S. application No. 07/899,611. Said runner is provided with an extension of the lower wing of the Z forming a plurality of tabs which clasp the lower edge of the side panel of the drawer. Advantageously, in order to optimize the requirement of sheet metal, a pair of runners according to the aforesaid application is obtained by cutting the pair from a single portion of sheet metal, the plurality of individual extensions, or tabs, of the lower wing of the Z of one runner being cut from the lower wing of the Z of the other runner. In this way, each pair of runners, constituting a single portion of sheet metal before cutting, can be obtained while economizing considerably on material.

The general scope of this invention is to provide a machine for rapidly fitting metal runners clamped to a drawer, which is particularly simple in structure and permits a high working speed.

SUMMARY OF THE INVENTION

This scope is achieved, according to the invention, by providing a machine for clinching runners on drawers, said runners comprising gripping tabs laterally disposed along a U-shaped groove in the runner which receives a lower edge of the side panel of the drawer, the machine comprising at least one clinching assembly with a channel for receiving the groove of the runner and the edge of the side panel disposed therein, the channel being delimited on one side by hammer elements and on the other by anvil elements, mechanical operating means moving the anvil elements and hammer elements reciprocally towards one another to grip the portion of the runner in the channel between them and clamp the tabs against the side panel.

BRIEF DESCRIPTION OF THE DRAWINGS

The innovative principles of this invention and its advantages with respect to the known technique will be more clearly evident from the following description of a possible exemplificative embodiment applying such principles, with reference to the accompanying drawings, in which.

DETAILED DESCRIPTION OF THE INVENTION

Figure 1:
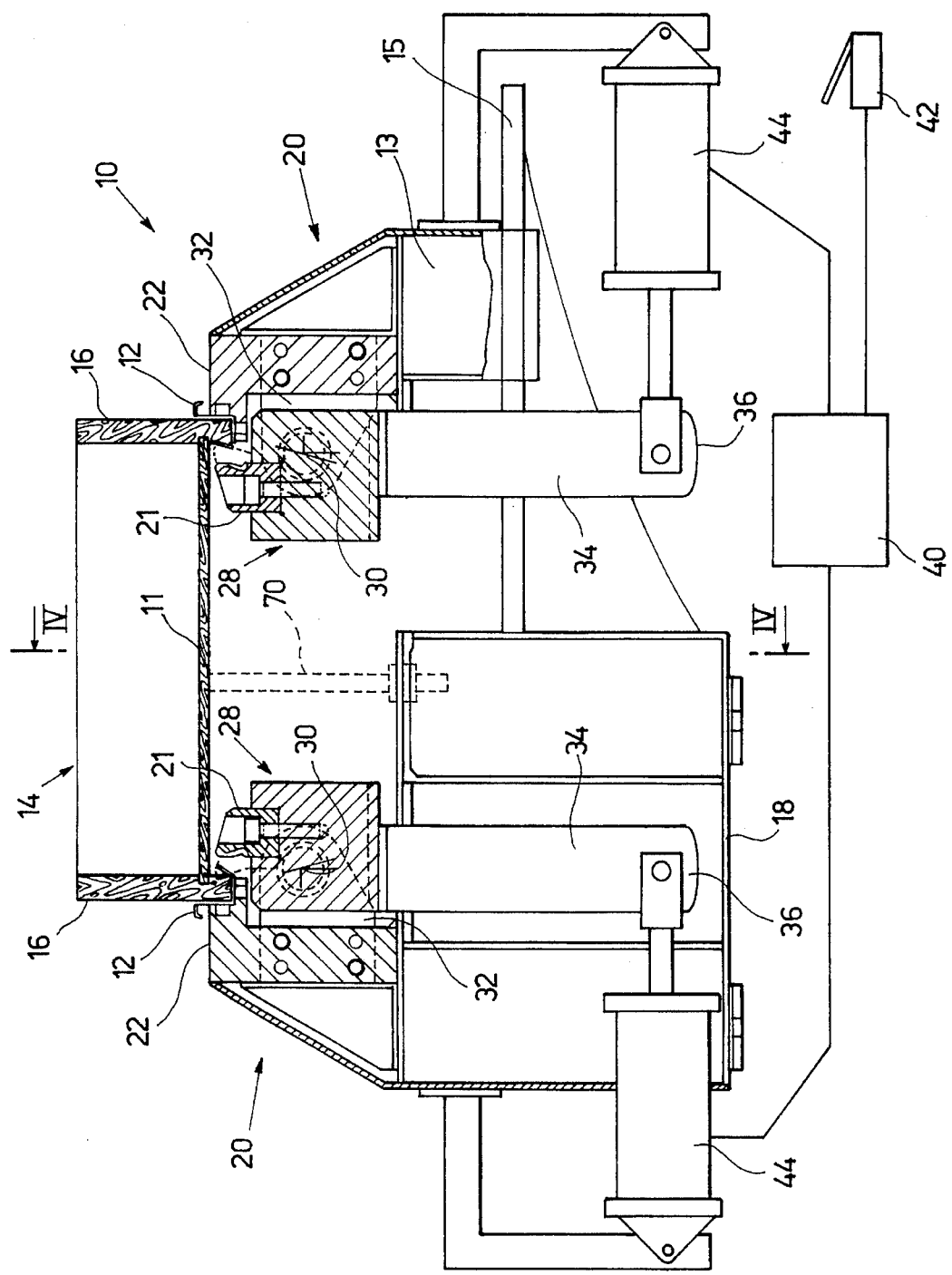
FIG. 1 shows a schematic longitudinal sectional view of a machine according to the invention.

With reference to the figures, FIG. 1 shows a machine 10 for fitting a specular pair of metal runners 12 to the side panels 16 of a drawer, generically indicated by reference 14, having a bottom panel 11.

The (FIG. 1) shows: on the left a runner in the fitting position but not yet secured; on the right the opposite runner already clamped.

Each runner 12 of the pair has a Section (at least in discrete points of its extension) of such dimensions as to define a U-shaped groove embracing the lower edge of the side panel. In particular, as can be more clearly seen in FIG. 2, the runner comprises a side towards the outside of the side panel which is bent to form an upper sliding channel 58, and a side 60 towards the inside of the side panel which can be bent towards the side panel to clamp the runner to it.

The machine 10 is composed of a frame 18 supporting a pair of specular clinching assemblies 20 disposed facing each other.

Figure 2:
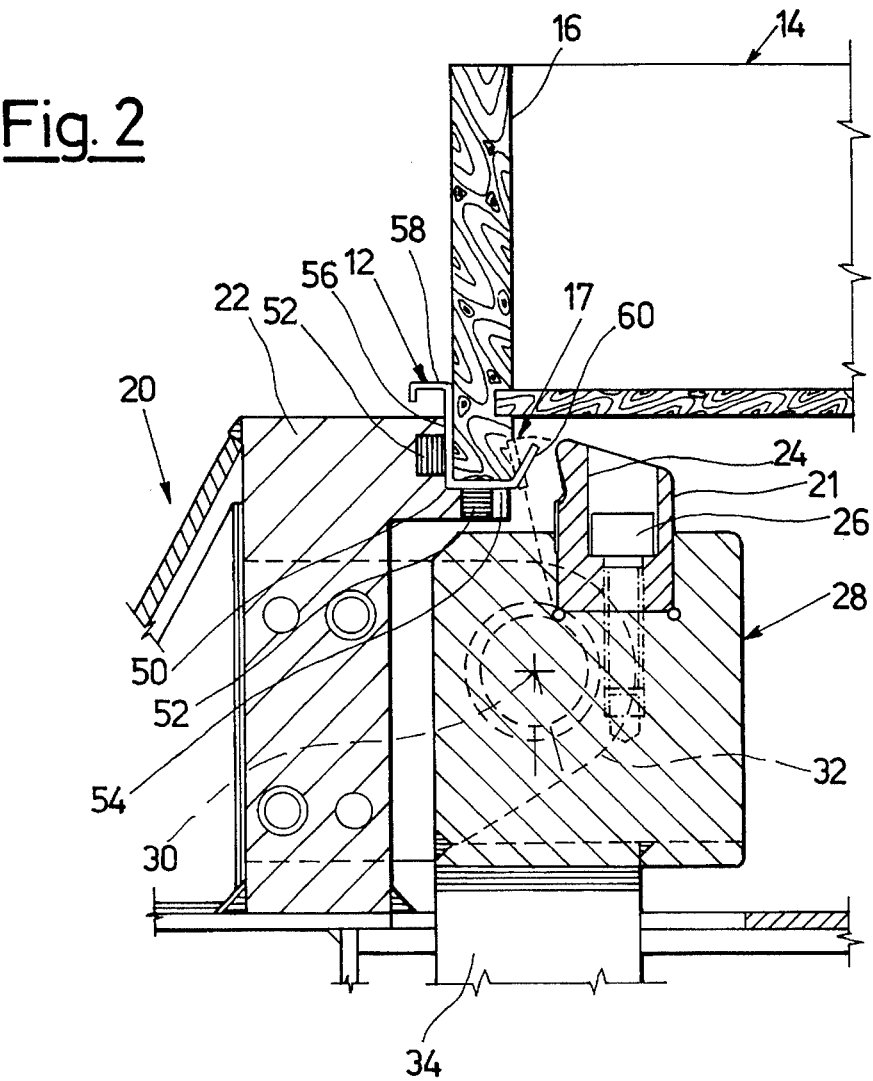
FIG. 2 shows an enlarged detail of a hammers-anvil assembly of the machine of FIG. 1.

As can be seen in greater detail in FIG. 2, each assembly 20 comprises a counter plate or anvil 22 disposed to face a riveting head 28 comprising a riveting hammer 21, so as to form a channel 1.7 to receive the U-shaped portion of the respective runner and the corresponding edge of the side panel 16.

The channels 17 of the two assemblies are disposed parallel to each other and are advantageously provided with a base protruding from the anvil to form a resting surface for the runner. Each channel extends sufficiently to be able to receive the entire length of the respective runner 12 of the longest drawer contemplated in the processing line.

The anvils 22 have a seat 50, shaped in the form of an L and advantageously provided, on its walls, with permanent magnets 52 so as to stably receive a runner 12, made of ferromagnetic metal, to be fitted to the side panel of the drawer. The lower 54 and side 56 faces of the runner respectively adhere to the walls of the L-shaped seat. The L-shaped seat is made with a height lower than that of the side face 56 of the runner, so that the upper face or channel 58 of the runner itself iS free above the anvil. Each head 28 is pivoted to supporting brackets 32, integral with the corresponding anvil, according to an axis of rotation 30 parallel to the extension of the channel 17.

Extending from each head 28 is an operating arm or lever 34 with its free end 36 connected to a linear actuator or actuating device for rotation of the head around the axis 30. For example, the actuating device can be a pneumatic cylinder 44 acting between the lever 34 and fixed part of the assembly 20. Upon operation of each piston the corresponding hammer is thus moved towards the anvil 22 facing it.

The pneumatic cylinders 44 and the means for intake and discharge of the air under pressure for their operation are of the known type and therefore will not be described or shown in detail herein. Each actuator is connected to a control device 40, which in turn is operated by an activation signal, for example emitted by a manual operating switch 42, advantageously of the pedal-operated type. The control device is substantially made according to a known technique (mechanical, electromechanical or electronic) and therefore is easily imaginable by the expert in the field.

Figure 3:
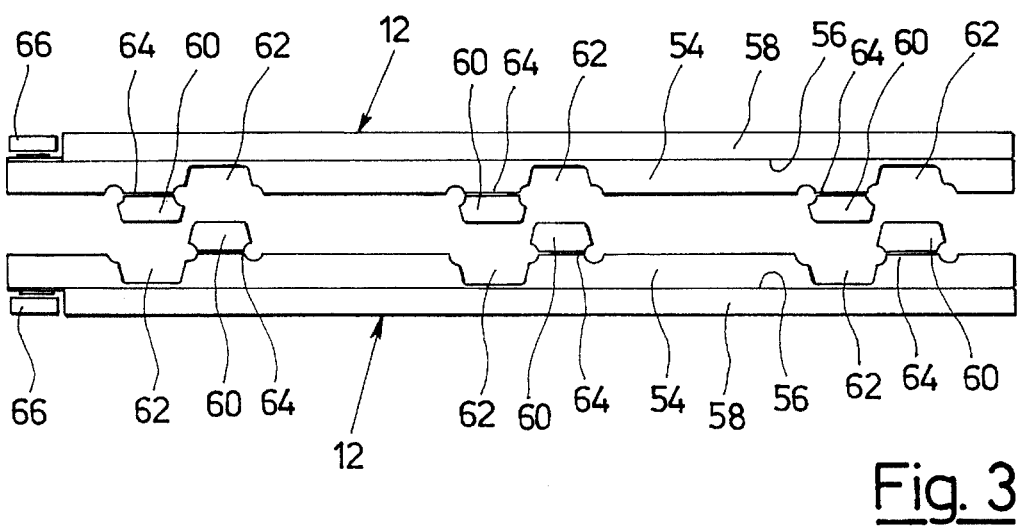
FIG. 3 shows a plan view of a pair of runners for drawers before assembly.
Figure 4:
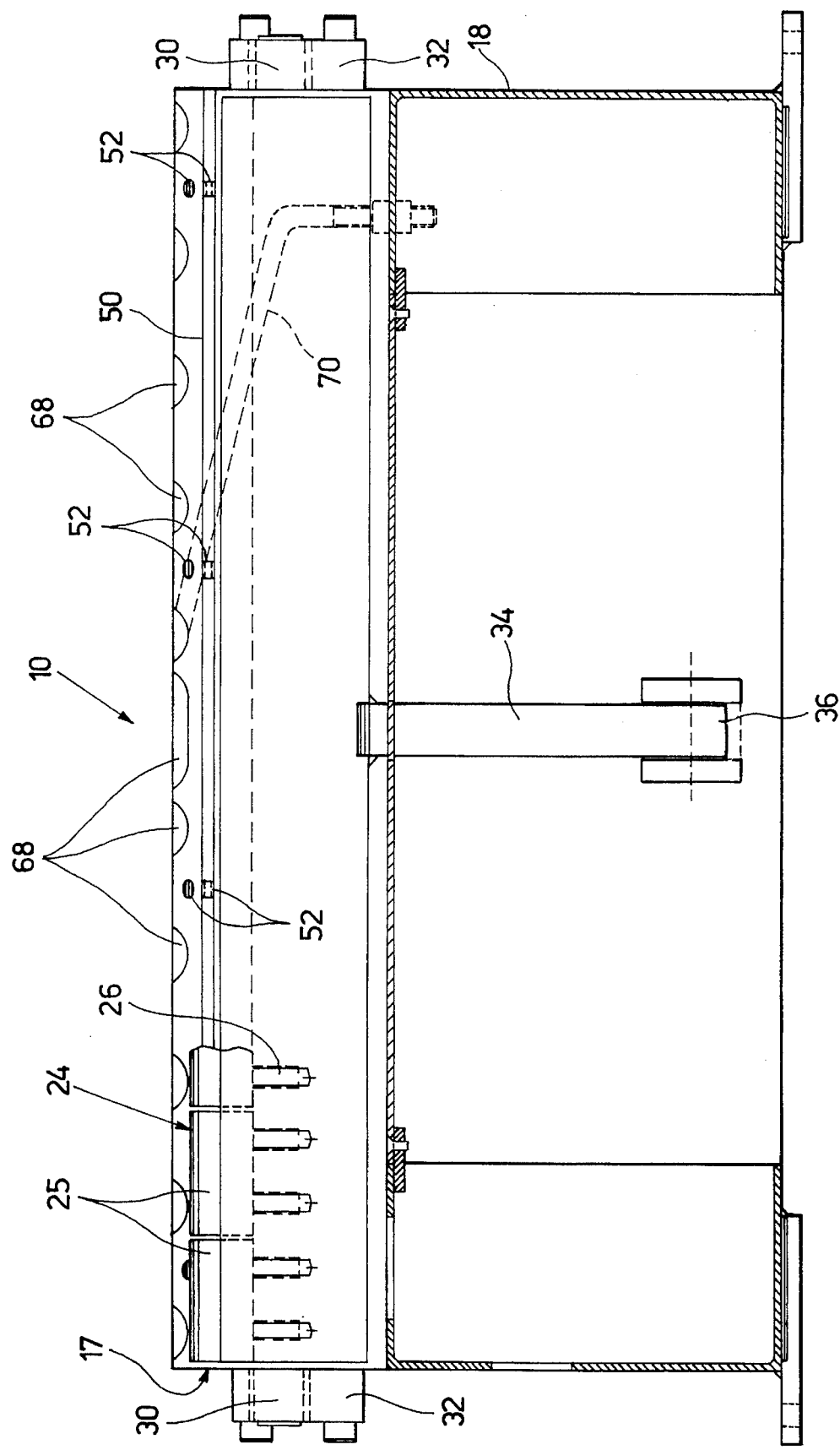
FIG. 4 shows a cross-sectional view along the line IV—IV of FIG. 1, with the drawer and several details removed.

To ensure greater flexibility of the machine the two clinching assemblies 20 are reciprocally adjustable in position so as to be able to adjust the distance of the two channels 17 in relation to the width of the drawer to be treated. For example, one of the two assemblies can be mounted on a saddle 13 sliding along runners 12, disposed perpendicular to the length of the channels 17. Advantageously, the internal bendable side of the runners 12 is composed of a plurality of tabs protruding from the base or bottom of the runner. For example, as mentioned previously and as shown in FIG. 3, the runners can have tabs 60 obtained by cutting them from the base of the other runner of the pair (creating recesses 62 therein), thereby economizing considerably on material. The tabs 60 are bent, during the production of the runners by cutting and pressing, according to an angle of less than 90° along lines 64, until they assume the configuration shown by the continuous line in FIG. 20 From FIGS. 2 and 3 it can be clearly seen that the tabs, even when bent, are the only elements of the runner to protrude laterally with respect to its base 54. Each runner 12 resting in the seat 50 of the anvil in turn forms a seat to receive, in a suitable position, a side panel 16 of the drawer being manufactured. As can be seen in FIG. 4, the surface of each anvil 22 has an upper edge with cavities 68, for example in the form of arcs of a circle, which can at least partially receive a wheel 66 which is normally provided at the rear end of the runner to enable the drawer to slide in the furniture unit, according to the known technique. Said cavities 68 are suitably spaced apart from one another so as to enable the anvil to receive runners of various lengths, enabling them to fit exactly in the L-shaped seat, with respect to the drawer, without any possibility of undesirable longitudinal movements. As can be seen in FIG. 4, each hammer can advantageously be composed of an aligned plurality of blocks 25, secured so as to be individually removable on the respective head 28. In this way it is possible to remove segments of the hammer wherever the clinching action is not required, for example in correspondence with the front panel or rear wall of the drawer, thereby making it possible to adapt the machine to drawers of differing lengths and types. In use, first of all the reciprocal distance of the clinching assemblies 20 are adjusted so that the distance between the channels 17 coincides with the distance between the side panels of the drawers to be produced. In addition, any blocks 25 which come to rest in correspondence with the front panel and rear wall of the drawer are removed. At this point, it is possible to insert the first pair of runners in the two channels 17 and place the drawer on them as shown in FIG. 1. When the switch 42 is operated the control device 40 operates the actuating devices 44, so as to bring the hammers 21 into contact with their respective counter anxils 22 and clamp the runners, riveting the tabs 60 into the pliable wall of the side panel. Each runner is thus firmly secured, as shown for the right-hand runner in FIG. 1 and, by the broken line, in FIG. 2. Advantageously, each hammer has a striking surface slanting towards the wall of the side panel, so as to facilitate the penetration of the free ends of the tabs. During the clinching operation, it is necessary to prevent any tolerances between the reciprocal position of the seats 17 and the effective distance of the two side panels of the drawer from creating excessive stress between the elements of the drawer, which could for example detach the two side panels from the rest of the structure. For this reason, on receiving the signal from the pedal 42, the control device 40 operates the two actuating devices 44 in two consecutive stages, so as to avoid the simultaneous clinching of the two runners and allow the relative crosswise movement of the drawer, so that the side panel subjected to clinching can fit freely into its channel 17. For example, the control device Can send activating signals to the two actuators at intervals of one second apart from each other.

Upon completion of the clinching operation, the drawer provided with runners can be removed from the machine and the cycle can be repeated with another pair of runners and another drawer.

At this point it will be clear that the intended scopes have been achieved by providing a machine which efficiently and reliably fits runners onto drawers. The clinching is carried out in a single operation and no manual skills are necessary on the part of the operator, such as for example those required for individually and sequentially aiming at a plurality of parts to be riveted. The machine is extremely safe to use since the space between the counter plate and the hammer is equivalent to the thickness of the side panel of the drawer.

Consequently, even in the event of inappropriate operation of the machine, and even if the fingers were to be placed in the clinching channel without the drawer, the operator would not suffer any physical injury. For greater safety sensors can also be provided to detect the presence of the runner in the channel, which enable the clinching operation. For example, it is possible to provide microswitches protruding into the channel 17 in such a way as to be operated by the runner inserted into it.

The foregoing description of an embodiment applying the innovative principles of this invention is obviously given by way of example in order to illustrate such innovative principles and should not therefore be understood as a limitation to the sphere of the invention claimed herein. For example, for drawers with particular conformations it is possible for the anvil portion to also be made with removable parts similarly to that shown for the hammer. The system for adjusting the distance between the two clinching assemblies can also differ from the one shown and, for example, can comprise known adjusting means of the type with an endless screw and a nut screw, usually used for remote controlled movement of carriages along runners, if necessary with a motorized mechanism. Moreover, both clinching assemblies can be provided sliding along runners in a crosswise direction to the channels receiving the side panels.

The machine can also be simplified by providing it with a single clinching assembly, the two runners being fitted sequentially by simply rotating the drawer by 180°, so as to position first one side panel and then the other inside the single clinching channel 17. In this case, the correct height of the drawer with respect to the machine can be maintained by means of an adjustable support 70, shown by the broken line in FIG. 1, on which the base of the drawer is rested.

It is also possible for the runners to be fitted onto the side panels before the drawer is manufactured. In which case, there is no need for the two opposing clinching assemblies, or for removable segments of the hammer. All these modifications can be easily imagined by the expert in the field in the light of the foregoing description.

What is claimed is:

1. Machine for clinching runners to the lower edges of the opposed side panels of a drawer, each of said runners comprising a plurality of gripping tabs laterally disposed along a longitudinal extending U-shaped groove formed in the runner to receive a lower edge of a side panel of the drawer, the machine comprising at least one clinching assembly having therein an elongated channel for receiving one of the runners with the lower edge of one of said side panels disposed therein in a longitudinal direction, channel being delimited on one side by a hammer and on the opposite side by an anvil, and a mechanical actuating means for moving the anvil and hammer reciprocally towards one another to grip said one runner in the channel between them and to clamp the tabs thereof against said one side panels, and characterized by the fact that the hammer comprises a plurality of hammer elements secured to a head that is pivotal by said actuating means about an axis that extends parallel to said channel.

2. Machine as claimed in claim 1, characterized by the fact that the anvil forms a seat extending along the channel and having a generally L-shaped cross section to receive said one runner.

3. Machine as claimed in claim 2, characterized by the fact that the seat comprises magnetic elements for retaining the runner which is made of ferromagnetic material.

4. Machine as claimed in claim 1, characterized by the fact that the actuating means comprise a linear actuator acting on a lever protruding from said head.

5. Machine as claimed in claim 4, characterized by the fact that the linear actuators comprise a pneumatic cylinder.

6. Machine as claimed in claim 1, characterized by the fact that each of the hammer elements has a striking surface slanting towards the channel in order to facilitate the penetration of free ends of the tabs into said one side panel.

7. Machine as claimed in claim 1, characterized by the fact that the hammer elements comprise a plurality of hammer blocks which can be individually and selectively removed at selected areas of the channel wherein clinching action is not desired in order to prevent interference with drawer parts.

8. Machine as claimed in claim 1, characterized by the fact that the anvil has therein a plurality of recesses spaced from each other longitudinally of said channel one said recesses being disposed to house a wheel protruding from said one runner.

9. Machine as claimed in claim 1, characterized by the fact that the machine further comprises a pair of said clinching assemblies equally spaced from each other and aligned parallel to each other on a horizontal plane, and each having a channel to receive a lower edge of a respective side panel of the drawer.

10. Machine as claimed in claim 9, characterized by the fact that the two clinching assemblies are adjustably movable transversely to the longitudinal direction of the channels.

11. Machine as claimed in claim 10, characterized by the fact that at least one of said pair of clinching assemblies is supported by a carriage running along runners crosswise to the longitudinal direction of the channels to enable the adjustment of the distance between the two assemblies.

12. Machine as claimed in claim 9, characterized by the fact that the two clinching assemblies are connected for their operation to a control device emitting respective activating signals with a pre-established reciprocal time delay upon operation of a clamping control device.

* * * * *